March 13, 1928. 1,662,438

W. F. REINHOLD

CLIP FOR TEMPORARILY SUPPORTING STRUCTURAL MEMBERS

Filed Oct. 21, 1927

Inventor
William F. Reinhold
By Pozept Powers
Attorneys

Patented Mar. 13, 1928.

1,662,438

UNITED STATES PATENT OFFICE.

WILLIAM F. REINHOLD, OF BUFFALO, NEW YORK.

CLIP FOR TEMPORARILY SUPPORTING STRUCTURAL MEMBERS.

Application filed October 21, 1927. Serial No. 227,702.

This invention relates to a clip for temporarily supporting structural members and is more particularly intended to be employed in the construction of buildings where the structural members are welded together and wherein it is undesirable to use temporary bolts or the like for supporting the structural members preparatory to welding.

The principal object of this invention is to provide a clip which can be quickly applied to the structural beam after it is hoisted into position in the usual manner and which when applied will reliably hold the beam in proper position for welding the same to the supporting beam.

A further object is to provide such a clip which can be readily removed after the beam has been welded, but in which provision is made for preventing accidental derangement of the clip, which derangement would possibly release the beam temperarily supported thereby and permit it to fall.

Another aim is to provide such a clip which operates to draw the supported beam flush with the supporting beam in the event that this is not effected when the beam is hoisted into position.

Still further objects are to provide such a clip which is strong and durable, inexpensive in manufacture, and can be used, within limits, on beams of varying proportions, to reduce shop welding costs and to support the joists in such manner that they can be safely walked on before they are welded without danger of the joists rolling or shaking.

Figure 1:
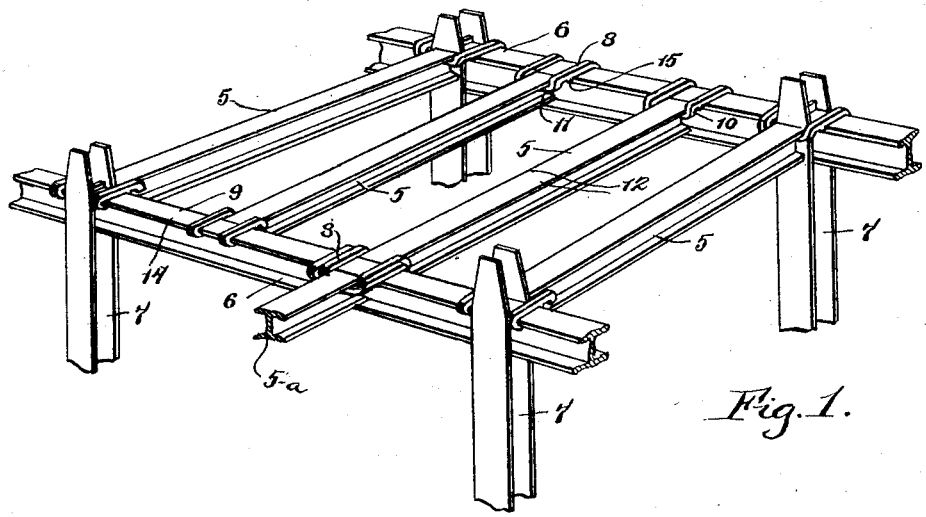
Figure 2:
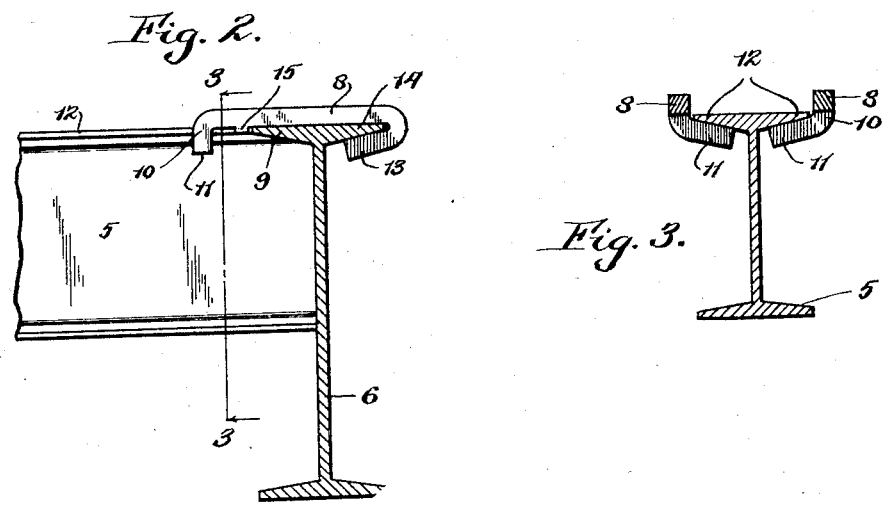
Figure 3:
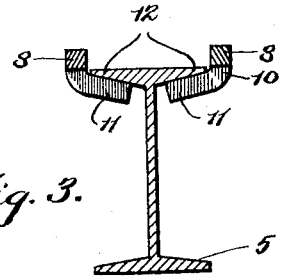
Figure 4:
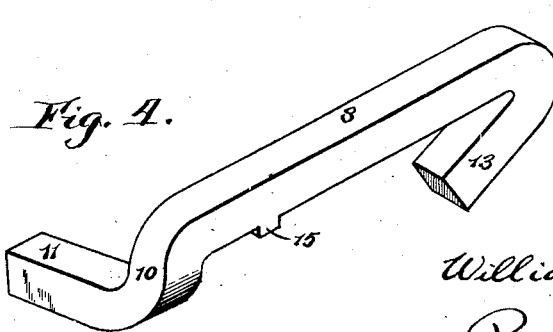

In the accompanying drawings:

Figure 1 is a perspective view of a steel structure showing the horizontal floor I-beams or joists temporarily supported by clips embodying my invention. Figure 2 is a vertical transverse section through a supporting I-beam or girder and showing my clip and the supported floor beam in elevation. Figure 3 is a vertical transverse section through the supported floor beam and clips, the same being taken on line 3—3, Fig. 2, and showing the manner in which the supporting fingers engage the under surfaces of the flanges of this beam. Figure 4 is a perspective view of one of the clips.

Similar reference numbers refer to the same part in each figure.

In the structure shown in Fig. 1, the girders 6 are in the form of I-beams and are welded at their ends to the sides of the steel columns 7 each of which columns is preferably formed at its upper end so as to permit the welding thereto of another column for supporting the next succeeding floor of the building in the usual and well known manner. Between the girders are arranged the horizontal floor beams or joists 5 which are temporarily supported by my clip preparatory to welding the ends of the same to the sides of the girders. These joists, as shown, are in the form of I-beams and their upper sides or flanges are usually arranged flush with the upper sides or flanges of the supporting girders, and the ends of the joists are formed to engage the side of the web of the supporting girder and the underside of the upper flange thereof, as shown in Fig. 2, so that these members can be securely welded together and form a rigid structure.

Each end of each of the joists is temporarily supported during the welding operation by a pair of clips which are carried by the girder and engage the undersides of the upper flanges of the joist. As best shown in Fig. 4, each of these clips is made of bar stock which is preferably square in cross section, the central body portion 8 being flat and resting on the upper side of the upper flanges of the girder. At one end, the clip extends beyond the edge of the girder flange 9 against which the joist abuts, and this projecting end is formed to provide a downwardly extending intermediate portion 10 and a laterally extending supporting finger 11, the finger being thereby depressed below the level of the body portion 8 and being thereby adapted to engage under the upper flange 12 of the joist as shown in Fig. 3. The other end of the clip is formed to provide an under turned hook 13 which is adapted to engage under the other flange 14 of the girder and thereby anchor that end of the clip and supporting the opposite end of the clip which carries the joist. This underturned hook is preferably inclined to conform to the inclination of the underside of the flange 14 of the girder in order to insure reliable engagement, and the supporting finger 11 is likewise inclined to conform to the inclination of the joist flanges 12. By this means, if it is desired to raise the joist, the clips may be hammered to drive the fingers further under the joist flanges and thereby elevate the joist and if it is desired to lower the joist, the clips may be driven out sufficiently to permit the joist to lower the desired extent. Two clips are necessary for each end of the girder, the supporting fingers of each pair being, of course, bent in opposite directions.

In constructing a building employing clips embodying my invention, the clips are first arranged in pairs at the places where the joists are to be located, the joists are hoisted into position, the fingers 11 of each of the clips placed under the upper flanges of the joist and the clips driven home. The joists are thereby temporarily held in position and after the joist is welded to the girder, the clips are knocked out and used on other joists.

To prevent the clips from being kicked off the girder by the men walking along the same, a lug or bead 15 is provided on the underside of the body 8 of the clip at a point which is adjacent the edge of the flange 9 of the girder. This lug is preferably rectangular in cross section thereby to provide a vertical inner face which prevents the lug from riding over the girder. In the event that the clip is accidentally struck at one side, this lug engages the edge of this girder flange and prevents it from being knocked off of the girder. This lug does not, however, prevent the clip from being driven sidewise away from the joist after it is welded, nor is it sufficiently high to prevent the ready removal of the clip from the girder, the clip being retained in operative position by the downward pressure of the joist.

This invention provides an inexpensive and reliable clip for this purpose which is readily made from standard bar stock, it is quickly and easily applied to and removed from the joist, and one size of clip may be employed to support beams of varying proportions.

When it is desired to temporarily support the joists which abut against the columns 7, as indicated by the end joists in Fig. 1, clips having somewhat longer supporting fingers are employed, the body of each clip extending alongside the column, and the finger extending under the joist and supporting the same. Similar clips having elongated fingers can be employed where a second joist, such as the joist 5ª in Fig. 1, is arranged in line with and on the opposite sides of the girder. In this case the clips supporting the second joist are arranged alongside of the first clips and their elongated fingers extend under the flanges of the second joist.

I claim as my invention:

1. A clip of the character described, comprising a body portion adapted to rest on the upper side of the supporting beam, a finger at one end of said body extending laterally outward therefrom parallel with said supporting beam and adapted to engage an under surface of the supported beam and means coacting with said supporting beam for preventing downward movement of said finger.

2. A clip of the character described, comprising a body portion adapted to rest on the upper side of the supporting beam, said body being extended beyond said beam and being laterally offset parallel with said supporting beam to form a finger adapted to engage an under surface of the beam being supported, and means coacting with said supporting beam for preventing downward movement of said finger, but permitting lateral movement of said clip.

3. A clip of the character described, comprising a body portion adapted to rest on the upper surface of the supporting beam, said body being extended beyond said beam and said extended portion being bent first downwardly and then laterally parallel with said supporting beam thereby to form a lateral finger depressed relative to said body portion for supporting an under surface of the supported beam, and means for securing said body portion to said supporting beam.

4. A clip for temporarily supporting the end of an I-beam at an angle to a supporting I-beam comprising a body portion adapted to rest on the upper flanges of the supporting beam, the end of said body adjacent said supported I-beam being extended beyond the end of the upper flange of said supporting beam and said extended portion being bent first downwardly and then laterally parallel with said supporting beam thereby to form a laterally extending finger which is depressed relative to said body portion, a hook on the other end of said body adapted to engage under the corresponding upper flange of said supporting beam, said finger engaging the under surface of the adjacent flange of said supported beam and being inclined to conform to the inclination of said flange of said supported beam.

5. A clip of the character described, comprising a body portion adapted to rest on the upper surface of the supporting beam, a hook at one end of said clip adapted to engage an under surface of said supporting beam, a laterally extending finger at the opposite end of said body adapted to engage an under surface of the supported beam, and means for preventing accidental derangement of said clip comprising a shoulder formed on the underside of said clip at the last mentioned end of said clip and adjacent the edge of the flange of said supporting beam.

6. A clip of the character described, comprising a body portion adapted to rest on the upper surface of the supporting beam, a hook at one end of said clip adapted to engage an under surface of said supporting beam, a laterally extending finger at the opposite end of said body adapted to engage an under surface of the supported beam, and means for preventing accidental derangement of said clip comprising a shoulder provided on the underside of the body of said clip at the last mentioned end of said clip and adjacent the edge of said supporting beam.

7. As an article of manufacture, a clip for temporarily supporting a structural member comprising a body portion, an under turned hook at one end of said body portion and a laterally extending finger at the other end of said body portion, said finger projecting at substantially right angles to said body portion.

8. As an article of manufacture, a clip for temporarily supporting a structural member comprising a body portion one end of which is under turned to form a hook and the other end bent first downwardly and then laterally at a substantially right angle to said body portion to form a supporting finger which is depressed relative to said body portion.

In testimony whereof I affix my signature.

WILLIAM F. REINHOLD.